No. 874,119.
J. E. SACKETT.
ROLLER BEARING.
APPLICATION FILED JUNE 8, 1907.
PATENTED DEC. 17, 1907.
2 SHEETS—SHEET 2.
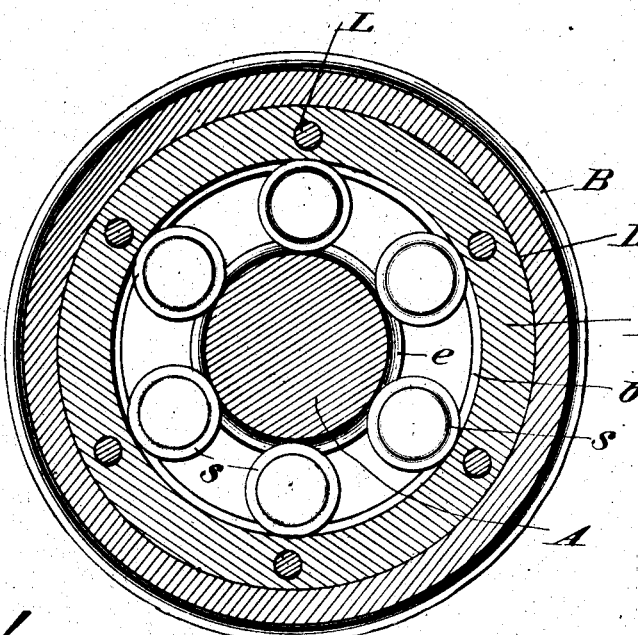
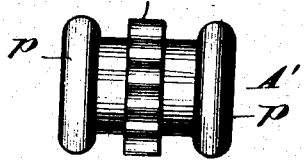
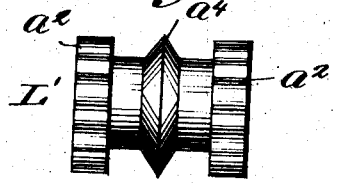
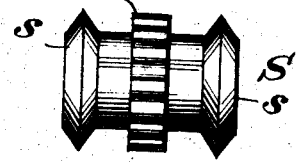
Witnesses
Phil E Barnes
J. J. Sheehy Jr.
Inventor
J. E. Sackett,
By James J Sheehy
Attorney

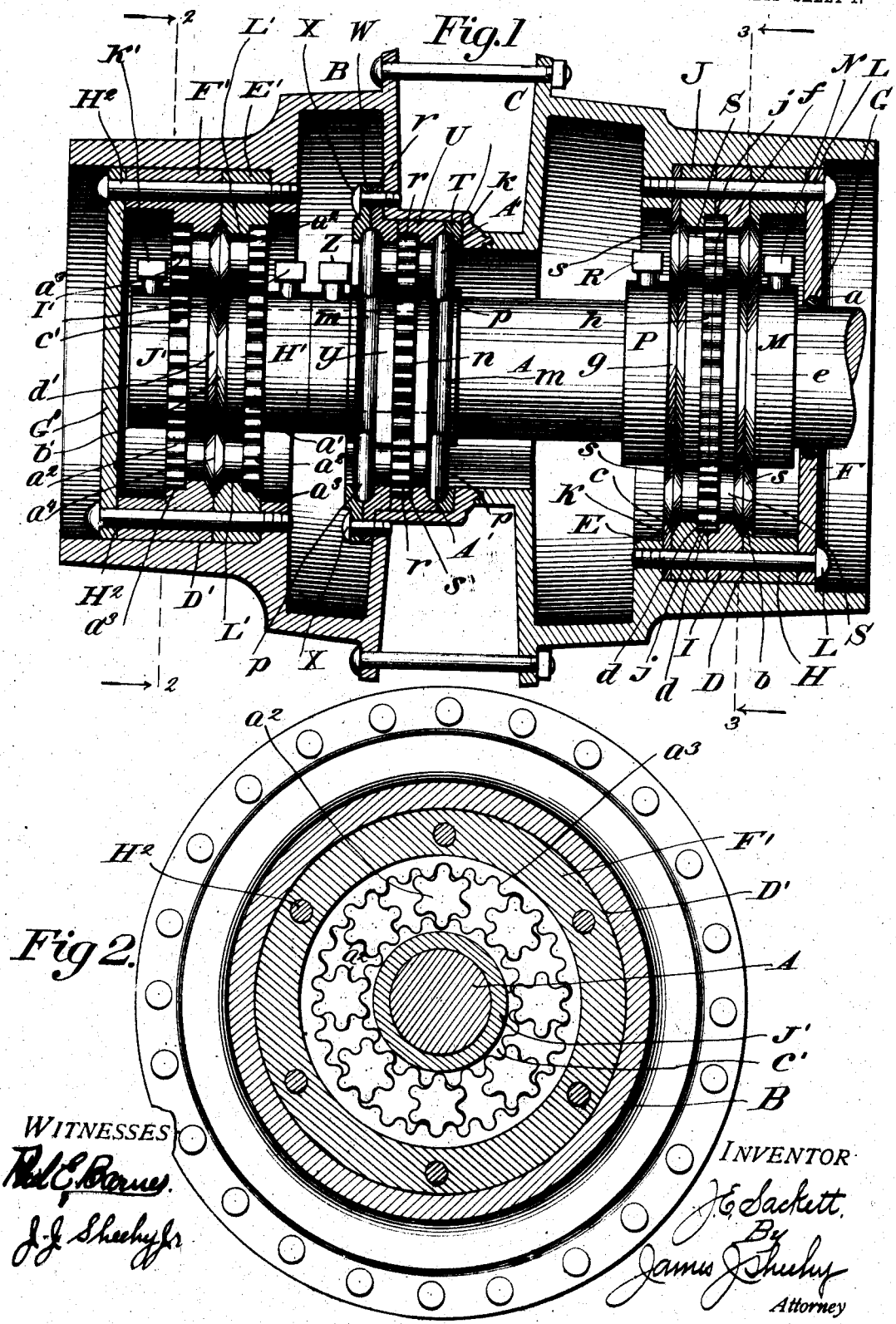

UNITED STATES PATENT OFFICE.

JAMES E. SACKETT, OF SPARROW BUSH, NEW YORK.

ROLLER-BEARING.

No. 874,119.  Specification of Letters Patent.  Patented Dec. 17, 1907.

Application filed June 8, 1907. Serial No. 377,971.

*To all whom it may concern:*

Be it known that I, JAMES E. SACKETT, citizen of the United States, residing at Sparrow Bush, in the county of Orange and State of New York, have invented new and useful Improvements in Roller-Bearings, of which the following is a specification.

My present invention relates to roller bearings; and it contemplates the provision of a roller bearing designed for use to advantage in vehicle wheels, loose pulleys and the like, and embodying such a construction that friction is reduced to a minimum without the use of lubricant, and dust is effectually excluded from the anti-friction parts.

The invention will be fully understood from the following description and claims when the same are read in connection with the drawings, accompanying and forming part of this specification, in which:

Figure 1 is a view, partly in longitudinal section and partly in elevation, illustrating a wheel hub embodying the construction constituting the present and preferred embodiment of my invention. Fig. 2 is a transverse section taken in the plane indicated by the line 2—2 of Fig. 1. Fig. 3 is a transverse section taken in the plane indicated by the line 3—3 of Fig. 1, and: Figs. 4, 5 and 6 are elevations illustrating the three kinds of anti-friction rollers employed in my novel roller bearing.

Similar letters designate corresponding parts in all of the views of the drawings, referring to which:

A is a shaft or axle, and B is the casing of my improvements, which is illustrated as a wheel hub. The said casing B is shown as provided with spoke sockets C. In its ends the said casing B is provided with inner and outer smooth-bores D, D', Fig. 1, and at the inner ends of said bores it has annular, inwardly-directed flanges E, for a purpose presently set forth.

F is a dust-band snugly arranged in the inner bore D.

G is a gasket seated in a groove $a$ in the inner edge of the band F and snugly receiving the shaft or axle A.

H, I, J and K are bearing-rings, preferably of steel, fitted close in the smooth bore D and between the inner flange E of casing B and the dust-band F; and L L are headed bolts extending through the dust-band F and the bearing-rings H, I, J and K, and threaded into the said inner flange E of casing B. By virtue of this construction it will be seen that subsequent to the removal of the bolts L the dust-band F and the several bearing-rings mentioned may be readily removed from the casing B and replaced with new parts, and this without the employment of skilled labor. The inside opposed portions of the bearing-rings H and I are shaped to form an annular groove $b$ of V-shape in cross-section, and the inside opposed portions of the rings J and K are shaped to form a similar groove $c$; while the inside opposed portions of the rings I and J are rabbeted and toothed as indicated by $d$.

M is a sleeve fixed on the shaft or axle A through the medium of a set-screw N and having a V-shaped circumferential groove $e$ in vertical alinement with the before-mentioned groove $b$, and also having a toothed rabbet or recess $f$ at its outer end.

P is a sleeve fixed on the shaft or axle A through the medium of a set screw R and having a V-shaped, circumferential groove $g$ in vertical alinement with the before-mentioned groove $c$ and also having a toothed rabbet or recess $h$ at its inner end, and S S are anti-friction rollers, of which six are preferably employed, interposed between the sleeves M P and the series of bearing-rings H, I, J and K. The rollers S respectively comprise end portions $s$ having perimeters of V-shape in cross-section and adapted to move between the V-shaped grooves in the bearing-rings and the similar grooves in the sleeves, and a middle spur-gear portion $j$ arranged to move in the rabbeted and toothed portions of the bearing-rings and sleeves. It will thus be seen that the rollers S are all retained in their proper relative positions, and that they are compelled to travel with the bearing-rings and the casing B with the result that friction incident to rotation of the casing B is reduced to a minimum.

On the inner ends or bottoms of the spoke sockets C shoulders or abutments $k$ are provided, and against said shoulders is arranged the inner of four bearing-rings, preferably of steel. The said bearing-rings are lettered T, U, V and W and are shaped as shown in cross-section; also, the two outer bearing-rings V and W of the series are flanged and detachably connected through bolts X with the outer walls of the spoke sockets C, this in order that any bearing-ring may be readily removed and replaced with a new ring when necessity demands.

Y is a sleeve secured through a set screw Z on the shaft or axle A and having smooth circumferential grooves $m$ and also having a toothed circumferential groove $n$; and A′ A′ are anti-friction rollers of which eight are preferably employed between the bearing-rings T, U, V, W and the sleeve Y. The said rollers A′ respectively comprise end portions $p$ shaped to bear in the correspondingly-shaped grooves of the bearing-rings and sleeve Y, and a middle toothed portion $r$ adapted to engage the teeth $s'$ on the bearing-ring U and the teeth in the groove $n$ of the sleeve Y. In this arrangement the toothed portions of the rollers A′ retain the rollers in their proper relative positions and assure the rollers traveling with the casing B.

E′ and F′ are bearing-rings, preferably of steel, arranged in the outer smooth bore D′ of casing B. G′ is a dust-plate also arranged in said bore D′, and H² H² are headed bolts extending through said dust-plate and bearing-rings and threaded into the outer flange E of casing B. Thus it will be seen that when impaired, either of the bearing-rings E′ F′ may be readily removed and replaced with a new bearing ring.

H′ is a sleeve detachably secured through a set screw I′ on the shaft or axle A and having a toothed groove $a'$ and a rabbeted outer end $b'$.

J′ is a sleeve detachably secured by a set screw K′ on the shaft or axle A and having a toothed groove $c'$ and a rabbeted inner end $d'$, and L′ L′ are anti-friction rollers, of which eight are preferably employed, interposed between the bearing-rings E′ F′ and the sleeves H′ and J′. The said rollers L′ each have end toothed portions $a^2$ to engage the toothed grooves of the sleeves H′ and J′ and the toothed portions $a^3$ of the bearing-rings E′ and F′, and an intermediate portion $a^4$ having a perimeter of V-shape in cross-section adapted to move in the V-shaped groove formed by the rabbeted ends of the sleeves H and J′ and the rabbeted ends of the bearing-rings E′ and F′. Thus the relative arrangement of the rollers L′ is preserved and said rollers are compelled to travel with the casing B to conduce to the friction-eliminating qualities of the bearing.

It will be gathered from the foregoing that my level roller-bearing is efficient in operation without the use of lubricant, and that it is dust-proof and simple and inexpensive in construction and is well adapted to withstand the hard usage to which roller-bearings are ordinarily subjected.

The construction herein shown and described constitutes the preferred embodiment of my invention, but it is obvious that in practice various changes in the form, construction and relative arrangement of parts may be made without involving departure from the scope of my invention as defined in the claims appended.

Having described my invention, what I claim and desire to secure by Letters-Patent, is:

1. In a roller bearing, the combination of a shaft or axle, a casing having a circular series of spoke sockets and abutments at the inner ends thereof and also having smooth bores at its ends and annular abutments at the inner ends of said smooth bores, bearing rings arranged side by side within the circular series of spoke sockets and forming annular smooth grooves and an annular toothed recess, means connected with the walls of the spoke sockets for detachably retaining said bearing rings in position, bearing rings arranged side by side in the end smooth bores of the casing and forming annular smooth grooves and annular toothed recesses, bolts detachably connecting one set of the latter bearing rings with the adjacent abutment of the casing, bolts detachably connecting the other set of the latter bearing rings to the adjacent abutment of the casing, sleeves detachably secured on the axle, within the casing, and forming circumferential grooves and circumferential toothed recesses, and three sets of anti-friction rollers interposed between the bearing rings and the sleeves and having smooth portions disposed in the opposed smooth grooves of the rings and sleeves and toothed portions arranged between and engaging the teeth of the rings and sleeves.

2. In a roller bearing, the combination of a casing having a circular series of spoke sockets and abutments at the inner ends thereof, bearing rings arranged side by side within the circular series of spoke sockets and forming annular smooth grooves and an annular toothed recess, means connected with the walls of the spoke sockets for detachably retaining said bearing rings in position, an axle extending through the casing and provided with a sleeve having circumferential grooves and a circumferential toothed recess, and anti-friction rollers interposed between the bearing rings and the sleeve and having smooth portions disposed in the opposed smooth grooves of the rings and sleeve and toothed portions arranged between and engaging the teeth of the rings and sleeve.

3. In a roller bearing, the combination of a shaft or axle, a casing having interior, annular abutments and smooth bores extending from the said abutments to the ends of the casing, bearing rings removably arranged side by side in the smooth bores of the casing and each forming one-half of a smooth annular groove; some of said rings also forming annular toothed recesses, bolts detachably connecting one set of the said bearing rings with the adjacent abutment of the casing, bolts detachably connecting the other set of the bearing rings to the adjacent abutment of the casing, sleeves detachably secured on the shaft or axle, within the casing, and forming circumferential grooves and circumferential toothed recesses, and anti-friction rollers interposed between the bearing rings and the sleeves and having smooth portions disposed in the opposed grooves of the rings and sleeves and toothed portions arranged between and engaging the teeth of the rings and sleeves.

4. In a roller bearing, the combination of a casing having an interior annular abutment and a smooth bore at one side of the said abutment, bearing rings arranged side by side within the smooth bore and each forming one-half of an annular smooth groove and one of said rings also having an annular toothed recess, means detachably connecting the rings with the abutment, an axle extending through the casing and provided with a sleeve having a circumferential groove and a circumferential toothed recess, and anti-friction rollers interposed between the bearing rings and the sleeve and having smooth portions disposed in the opposed smooth grooves of the rings and sleeve and toothed portions arranged between and engaging the teeth of the rings and sleeve.

In testimony whereof I have hereunto set hand in presence of two subscribing witnesses.

JAMES E. SACKETT.

Witnesses:
WILLIAM J. MARTIN,
WILLIAM P. GREGG.